United States Patent [19]

Tall

[11] 4,379,618

[45] Apr. 12, 1983

[54] MAGNIFIER VIEWER AND STAND

[76] Inventor: Marion A. Tall, 10419 NW. 32nd Pl., Apt. 236, Bellevue, Wash. 98004

[21] Appl. No.: 243,838

[22] Filed: Mar. 16, 1981

[51] Int. Cl.³ .......................... G02B 27/02; G02B 7/02
[52] U.S. Cl. ...................................... 350/239; 350/255
[58] Field of Search ............................... 350/235–251, 350/255, 257; 248/441 R, 441 A, 450

[56] References Cited

U.S. PATENT DOCUMENTS

| | | | |
|---|---|---|---|
| 1,707,351 | 4/1929 | Fiske | 350/255 |
| 1,957,716 | 5/1934 | Köster | 350/239 |
| 2,604,009 | 7/1952 | Walrath | 350/241 |
| 3,753,610 | 8/1973 | Samuel | 350/248 |
| 4,030,814 | 6/1977 | Clifton et al. | 350/239 |
| 4,054,373 | 10/1977 | Davies et al. | 350/241 |
| 4,120,564 | 10/1978 | Rios | 350/241 |

FOREIGN PATENT DOCUMENTS

| | | | |
|---|---|---|---|
| 1098179 | 7/1955 | France | 350/238 |
| 1313665 | 11/1962 | France | 248/441 |

OTHER PUBLICATIONS

Postmatic, Advertisement From Postmatic Comp. Catalog, Lafayette Hill, Penn., p. 43, 12-1-77.

*Primary Examiner*—William H. Punter
*Attorney, Agent, or Firm*—Harpman & Harpman

[57] ABSTRACT

A magnifier viewer and stand for holding and viewing printed material and the like has a one piece base for holding the material to be viewed and a wide area magnifying lens and support adjustably positioned on the base.

4 Claims, 2 Drawing Figures

MAGNIFIER VIEWER AND STAND

BACKGROUND OF THE INVENTION (1) Field of the Invention

This invention relates to magnifying devices for use in viewing reading material. Such devices have a holder for the reading material and a magnifying lens in spaced relation thereto.

(2) Description of the Prior Art

Prior art devices of this type hold the reading material so it can be viewed through a magnifying lens. See for example U.S. Pat. Nos. 4,030,814, 4,120,564 and 2,604,009.

In U.S. Pat. No. 4,030,814 a magnifier and viewer is disclosed having a fixed lens and magnetic card holder.

U.S. Pat. No. 4,120,564 discloses a reading stand and magnifier wherein a fixed lens and a movable reading material holder are positioned on a flat base.

Applicant's invention has a one piece base which is formed so as to provide support for a book or other objects placed thereon, a magnifying lens is movable toward and away from the reading material and arranged so as to maintain a desirable spaced relationship therewith.

In Pat. No. 2,604,009, a magnifier and bookstand is disclosed in which a small movable lens is movably positioned over a small portion of the material to be viewed.

Applicant's device enables all of the reading material to be viewed at one time and provides easy adjustment of the lens to accommodate different thicknesses of material put before it.

SUMMARY OF THE INVENTION

A magnifier stand for use with books or other printed material has a one piece base that holds the material to be viewed and an adjustable mounting for a magnifying lens. The magnifying lens is positioned in an adjustable frame at the proper angle to the reading material so that adjustments may be made to accommodate the reading material while maintaining a desirable space relationship to the reading material to be viewed.

DESCRIPTION OF THE PREFERRED EMBODIMENT

Figure 1:
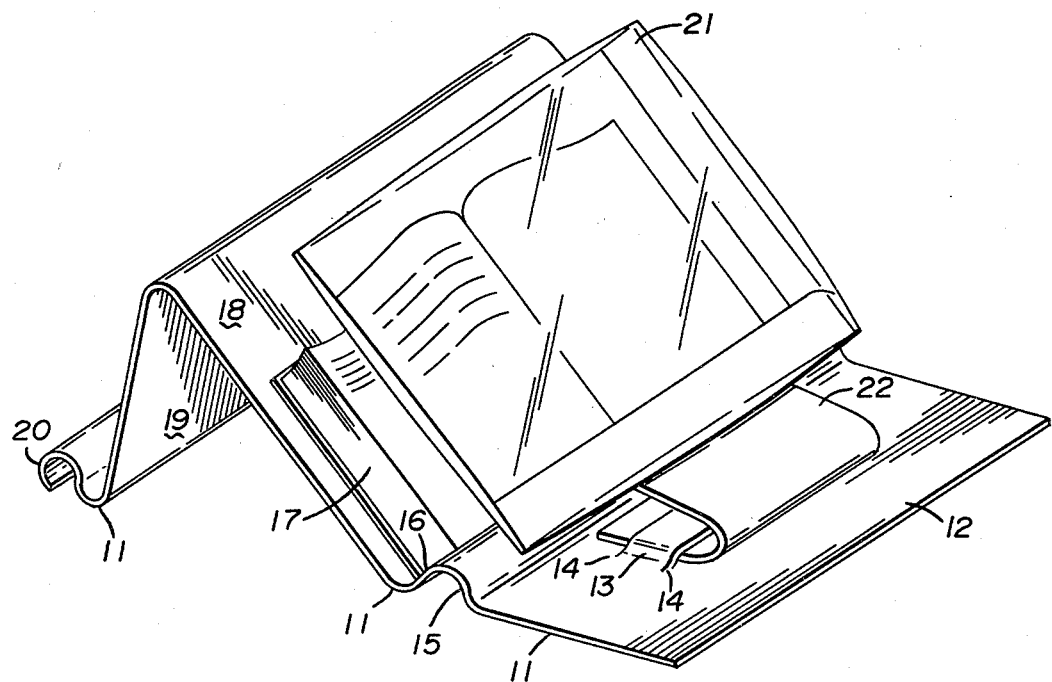
FIG. 1 is a perspective view of the magnifier viewer and stand.
Figure 2:
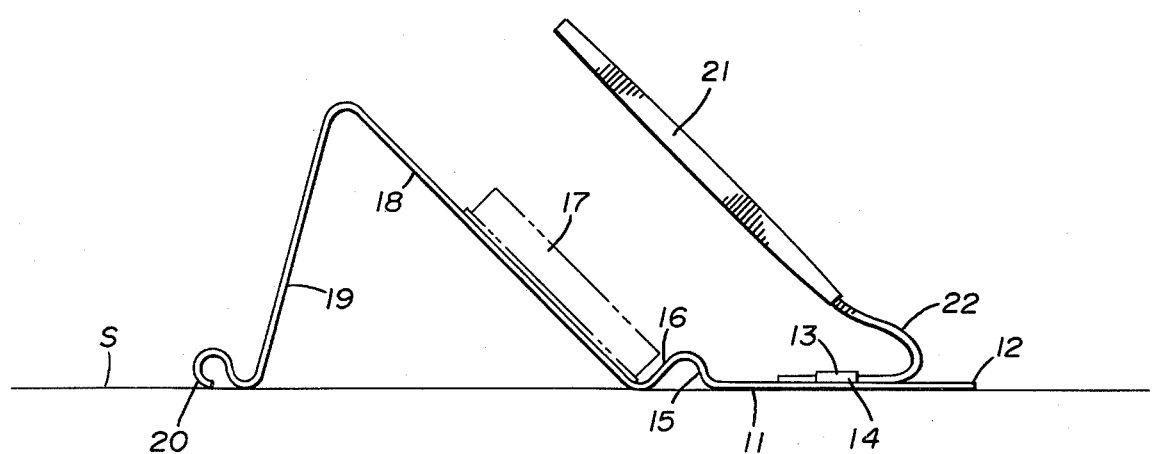
FIG. 2 is a side elevation thereof.

By referring to FIGS. 1 and 2 of the drawings, a magnifier stand 10 will be seen to have a one piece shaped base 11 which is preferably made of a flat rectangular sheet of synthetic resin material formed in the disclosed distinctive shape.

The base 11 has a flat front portion 12 with a raised space transversely positioned elongated center band 13 thereon. The band 13 is formed by spaced parallel cuts 14 with the material therebetween spaced upwardly forming an elongated opening between the cuts 14. A transversely extending rib 15 is defined by a compound curve formed inwardly from the raised band 13 and extends the entire width of the base 11. The back of the rib 15 forms an abutment 16 against which a book 17 may be positioned when positioned on the inclined portion 18 of the base 11. The incline portion 18 of the base 11 is formed at an angle of approximately 45° to the plane of the front portion 12 of the base 11. The book 17 can be placed on the inclined portion 18 of the stand. The incline portion 18 is supported by a downwardly extending portion 19 of the base 11 arranged in a substantially vertical position and terminating in a hooked shaped configuration 20 which supports the incline portion 18 of the magnifier stand.

A large rectangular magnifying lens 21 molded of a high optical quality synthetic resin such as LUCITE or PLEXIGLASS, the brand names for a polymer of methyl methacylate, is movably positioned on the base 11 in spaced relation to the incline portion 18. The lens 21 is molded with an integral support arm 22 as illustrated or can be molded separately and secured to the support arm 22. The support arm 22 is of a generally U-shaped configuration and of a width less than the area beneath the band 13. The support arm 22 is slidably inserted under the band 13 and can be moved relative thereto adjusting the lens 21 with respect to the book 17.

It will occur to those skilled in the art that friction material such as rubber can be secured to the underside of the base 11 where it engages a supporting surface S to prevent sliding of the base.

It will be seen that in the operation of the invention that the lens 21 and support arm 22 can be moved relative to the book 17 for focusing and that the relatively close fit of the support arm 22 in the space between the band 13 reduces lateral movement of the lens 21 and aids in maintaining proper focus by keeping the lens 21 parallel to the book 17.

Thus it will be seen that a new and useful device has been illustrated and described and that various changes may be made therein without departing from the spirit of the invention and having thus described my invention.

What is claimed is:

1. A magnifier viewer and stand having a one-piece base consisting of a rectangular sheet of synthetic resin formed in a continuous shape defining a flat horizontally disposed front portion, an upwardly extending compound curved portion adjacent said front portion and extending transversely of said base, the longitudinal edges of said curved portion being disposed on the plane of said flat front portion, an upwardly angled inclined portion adjacent said curved portion on the opposite edge thereof with respect to said front portion, said inclined portion arranged to support an opened book to be viewed with said book engaging said curved portion, a downwardly angled portion adjacent said inclined portion having a transversely extending lower section on said plane of said front portion, a secondary curved portion adjacent said lower section of said downwardly angled portion and extending transversely of said base, said secondary curved portion forming the terminal back edge of said one-piece base, transversely extending spaced slits in said flat front portion defining a band like section therebetween raised with respect to said plane of said front portion and a rectangular molded magnifier lens of a size comparable with said inclined portion of said base, a support arm for said lens, said support arm being curved between its ends to define a flat extension on one end slidably disposed beneath said band-like section of said front portion and an angled extension on its other end engaging said lens arranged to position said lens on the same angle as said upwardly angled inclined portion of said base.

2. The magnifier viewer and stand of claim 1 wherein said lens and support arm are integral and made of optical quality synthetic resin.

3. The magnifier viewer and stand of claim 1 and wherein said rectangular molded magnifier lens and said support arm are an integral unit with an angle between the plane of said lens and said flat extension of said support arm of substantially 45° from horizontal and wherein the plane of said upwardly angled inclined portion of said base is substantially parallel to the plane of said magnifier lens.

4. The magnifier viewer and stand of claim 1 wherein said secondary curved portion of said base comprises adjacent oppositely disposed downwardly and upwardly curving sections arranged in an undulating continuous shape in cross section.

* * * * *